(12) United States Patent  
Chen

(10) Patent No.: US 11,143,491 B2
(45) Date of Patent: Oct. 12, 2021

(54) SIGHTING DEVICE

(71) Applicant: Changing International Company Limited, Kowloon (HK)

(72) Inventor: Han-Che Chen, Taipei (TW)

(73) Assignee: CHANGING INTERNATIONAL COMPANY LIMITED, Kowloon (HK)

(*) Notice: Subject to any disclaimer, the term of this patent is extended or adjusted under 35 U.S.C. 154(b) by 350 days.

(21) Appl. No.: 16/114,685

(22) Filed: Aug. 28, 2018

(65) Prior Publication Data

US 2020/0072577 A1 Mar. 5, 2020

(51) Int. Cl.
*F41G 1/473* (2006.01)
*H04N 5/225* (2006.01)
*F41G 1/027* (2006.01)
*H04N 5/33* (2006.01)

(52) U.S. Cl.
CPC ............. *F41G 1/473* (2013.01); *F41G 1/027* (2013.01); *H04N 5/2253* (2013.01); *H04N 5/2254* (2013.01); *H04N 5/33* (2013.01)

(58) Field of Classification Search
CPC ....... F41G 1/473; F41G 1/027; H04N 5/2253; H04N 5/2254; H04N 5/33
USPC .......................................................... 42/111
See application file for complete search history.

(56) References Cited

U.S. PATENT DOCUMENTS

| 8,296,991 | B1* | 10/2012 | Chung ...................... F41G 1/46 42/111 |
| 2012/0097741 | A1* | 4/2012 | Karcher ................... F41G 3/142 235/404 |
| 2012/0159833 | A1* | 6/2012 | Hakanson ................. F41G 1/30 42/131 |
| 2016/0223805 | A1* | 8/2016 | Waterman ................. F41H 5/20 |
| 2017/0176139 | A1* | 6/2017 | Zhang ...................... F41G 1/36 |
| 2017/0176142 | A1* | 6/2017 | Zhang .................... H04N 5/772 |
| 2017/0284772 | A1* | 10/2017 | Beckman .............. F41G 3/2644 |
| 2018/0180384 | A1* | 6/2018 | Zhang .................... F41G 3/065 |

* cited by examiner

*Primary Examiner* — Joshua E Freeman
(74) *Attorney, Agent, or Firm* — Muncy, Geissler, Olds & Lowe, P.C.

(57) ABSTRACT

A sighting device is provided, configured to aim at a target, including a main body, a lens module, a display module, an infrared light assembly, and a filter member. The main body includes a first side and a second side. The lens module is disposed on the first side and has a lens element and an image sensor. The display module is disposed on the second side, connected to the lens module and configured to display an image. The infrared light assembly is disposed on the first side and can be switched between an open state and a closed state. The filter member is disposed between the lens element and the image sensor, and an infrared cutting region thereof is overlapping them or not according to the infrared light assembly in the closed state or the open state.

17 Claims, 11 Drawing Sheets

SIGHTING DEVICE

BACKGROUND OF THE INVENTION

Field of the Invention

The application relates in general to a sighting device, and in particular to a sighting device that includes an infrared (IR) light assembly and a filter member.

Description of the Related Art

Thanks to the ongoing development of technology, electronic products such as sighting devices are becoming increasingly versatile. For example, such devices can be mounted or disposed on a hunting implement such as a hunting rifle, to aid in targeting game. The possible applications of such devices grow as newer models continue to offer high performance. Traditional sighting devices for hunting game usually includes a mirror or a glass where an aim point is shown thereon, and the user directly watches the target and the aim point shown on the glass to aim at the target by eye. However, when hunting in the early morning or close to night, it is difficult for the user to sight a target using only his or her eyes. Therefore, to provide a good product design which is convenient for the user and easier to operate is an important issue.

BRIEF SUMMARY OF INVENTION

To address the deficiencies of conventional sighting devices, an embodiment of the invention provides a sighting device, configured to aim at a target, primarily comprising a main body, a lens module, a display module, an infrared (IR) light assembly, and a filter member. The main body includes a first side and a second side which is opposite to the first side. The lens module is disposed on the first side, wherein the lens module includes a lens element and an image sensor. The display module is disposed on the second side and is connected to the lens module, wherein the display module is configured to display an image captured from the lens module. The infrared light assembly is disposed on the first side, wherein the infrared light assembly can be switched between an open state and a closed state. The filter member is disposed between the lens element and the image sensor and having an infrared cutting region, wherein the infrared cutting region overlaps the lens element and the image sensor in the direction of the optical axis of the lens element according to the infrared light assembly in the closed state, and the infrared cutting region does not overlap the lens element when the infrared light assembly is in the open state. Therefore, the filter member can be switched via the on/off-state of the infrared light assembly.

In some embodiments, the filter member further has a transparent region, and when the infrared light assembly is in the open state, the transparent region overlaps the lens element and the image sensor in the direction of the optical axis. The infrared cutting region and the transparent region are arranged in a first direction, and the first direction is perpendicular to the optical axis. The sighting device further comprises an electromagnetic driving assembly disposed in the main body, wherein when the infrared light assembly is switched from the closed state to the open state, the filter member is forced to move along a first direction by the electromagnetic driving assembly. When the infrared light assembly is switched from the open state to the closed state, the filter member is forced to move along a second direction by the electromagnetic driving assembly, wherein the second direction is opposite to the first direction.

In some embodiments, the optical axis of the lens element, the central axis of the image sensor, and the central axis of the display module are coincidental, and an aim point is displayed on the display module according to the distance to the target. The sighting device further comprises a receiving space for receiving at least one battery and a plurality of buttons configured to move an aim line displayed on a display surface of the display module, wherein the receiving space and the buttons are disposed on the top side of the main body. The receiving space has an elongated structure for receiving the battery, and the long axis direction of the elongated structure is substantially perpendicular to the optical axis of the lens element. The sighting device further comprises a lid disposed on the top side of the main body, wherein the lid is configured to cover the buttons and the receiving space.

In some embodiments, the sighting device further comprises an adjusting ring disposed on the top side of the main body, wherein the adjusting ring is configured to adjust the lens module to perform optical focus or optical zoom. The adjusting ring has a main wheel and a plurality of protruding rods separately disposed on the main wheel, and the lens element has a barrel having a plurality of grooves, wherein the protruding rods correspond to and engage with the grooves. When the adjusting ring rotates, the protruding rods which engage with the grooves rotate and force the barrel to rotate in a rotating direction, and the lens of the lens element disposed in the barrel is forced to move along the optical axis of the lens element by the rotating barrel. The lens has an inner barrel and a lens unit, and the inner barrel protects the lens unit and is in contact with the barrel by a threaded connection. The sighting device further comprises a plurality of operating buttons disposed on the second side of the main body, wherein the operating buttons are configured to operate the lens module, the display module and the infrared light assembly.

In some embodiments, the sighting device further comprises a range finder module configured to determine the distance between the sighting device and the target, wherein the range finder module is disposed on a lateral side of the main body, and an aim point is displayed on the display module according to the distance to the target determined by the range finder module. A plurality of aim point positions are on a display surface of the display module in a direction that is perpendicular to the central axis of the display module, and when the range finder module determines the distance to the target, one of the aim point positions is lit as the aim point. There are at least twenty aim point positions on the display surface of the display module, and the aim points positions are arranged in a direction that is perpendicular to the central axis of the display module. The display module has a liquid-crystal display (LCD) panel. When the button is pressed, the range finder module performs and determines the distance to the target and the lens module performs video recording.

BRIEF DESCRIPTION OF DRAWINGS

The invention can be more fully understood by reading the subsequent detailed description and examples with references made to the accompanying drawings, wherein:

FIG. 9 is a schematic diagram of the display module displaying the target being aimed at.

DETAILED DESCRIPTION OF INVENTION

The making and using of the embodiments of the sighting devices are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted by an idealized or overly formal manner unless defined otherwise.

Figure 1A:
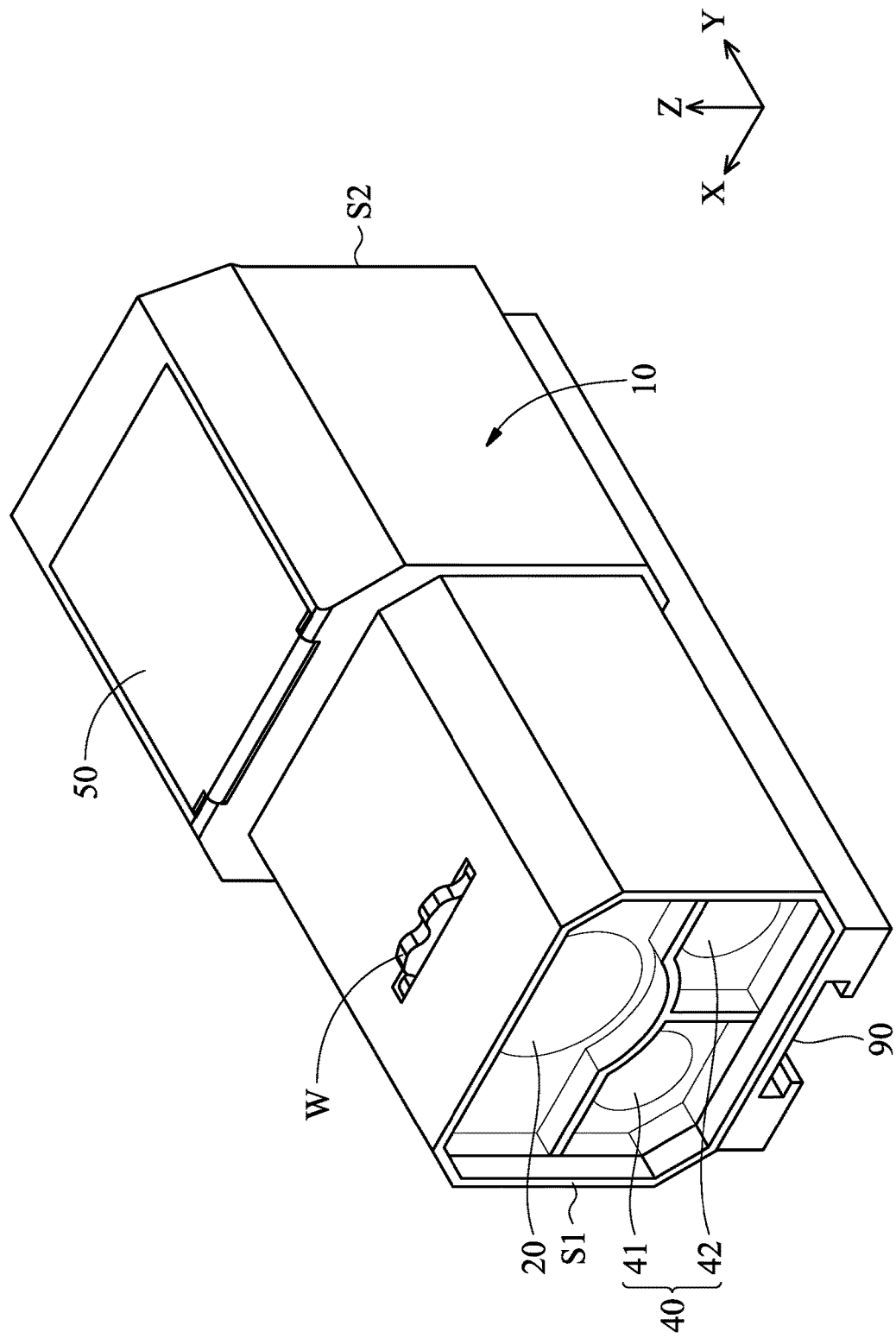
FIG. 1A is a schematic diagram of a sighting device according to an embodiment of the invention.
Figure 1B:
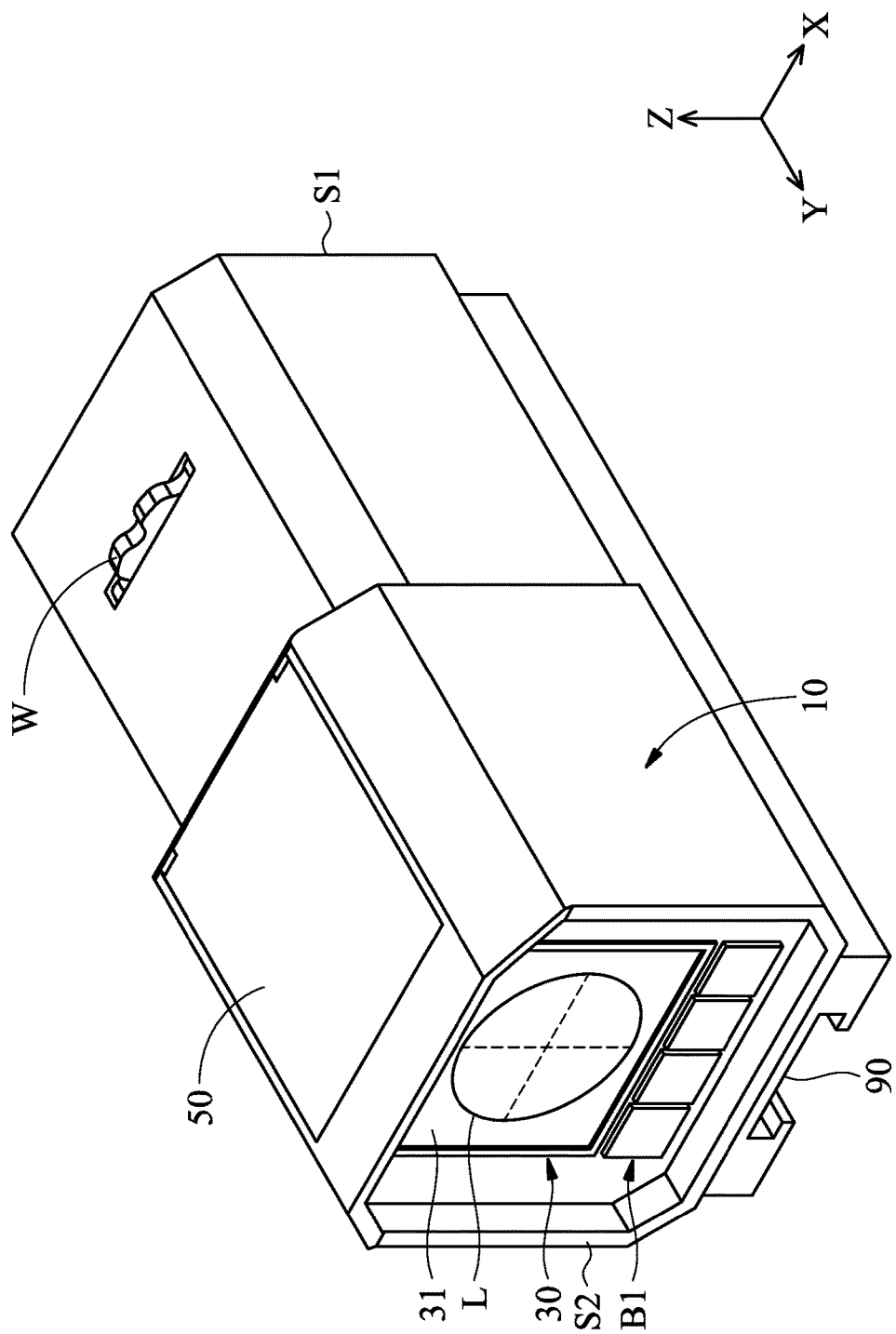
FIG. 1B is another perspective view of the sighting device in FIG. 1A.

FIGS. 1A and 1B are schematic diagrams of a sighting device 1 according to an embodiment of the present invention. As shown in FIGS. 1A and 1B, the sighting device 1, for example, may be a sight configured to sight or aim at a target, and the sighting device 1 is able to mount on a shooting device (such as a hunting rifle) via an engaging slot 90 thereof. A user may make an accurate hunting shoot via the sighting device 1. The detailed structure of the sighting device 1 is described below.

The sighting device 1 primarily comprising a main body 10, a lens module 20, and a display module 30 and an infrared (IR) light assembly 40. The main body 10 includes a first end S1 and second end S2 which are opposite each other. The lens module 20 and the infrared light assembly 30 are disposed on the first end 51, and the display module 30 is disposed on the second end S2. The sighting device 1 further comprises a plurality of operating buttons B1 which also are disposed on the second end S2 of the main body 10, wherein the operating buttons B1 are electrically connected to the lens module 20, the display module 30 and the infrared light assembly 40 and are configured to operate different functions of the them, such as turn on/off, adjusting the display brightness or sight brightness, zooming in, zooming out, or taking a photo or video.

The lens module 20 may be a camera, which is configured to capture an image of a target, wherein the lens module 20 includes a lens element 21 and an image sensor 22. The image sensor 22 can receive the light from the outside through the lens element 21 from the direction of the optical axis O of the lens element 21, to acquire the image. In some embodiment, an integrated circuit such as Complementary Metal-Oxide Semiconductor (CMOS) is disposed on the image sensor 22. In some embodiment, a charge-coupled device (CCD) may be disposed thereon.

The display module 30, such as a liquid-crystal display (LCD) display having an LCD panel, is electrically connected to the lens module 20 and is configured to display an image captured from the lens module 20. The infrared light assembly 40 has two infrared light sources: the first and the second infrared light sources 41 and 42. For example, they are infrared light LED (IR LED) units, each of them may include one or more light-emitting diodes, which can emit infrared (IR) light. When using the sighting device 1 at night, the user may press the button B1 to turn on the infrared light assembly 40 to run and provide infrared light, and the infrared light is reflected by the target and enters the lens module 20 for imaging. In some embodiments, the infrared light sources 41 and 42 with a plurality of light-emitting diodes may be arranged in a matrix (for example, a 3×3 or a 3×4 matrix). In the present embodiment, the infrared light assembly 40 is disposed under the lens module 20, and the lens module 20 is between the first and the second infrared light sources 41 and 42 in a direction that is perpendicular to the optical lens O.

Figure 2:
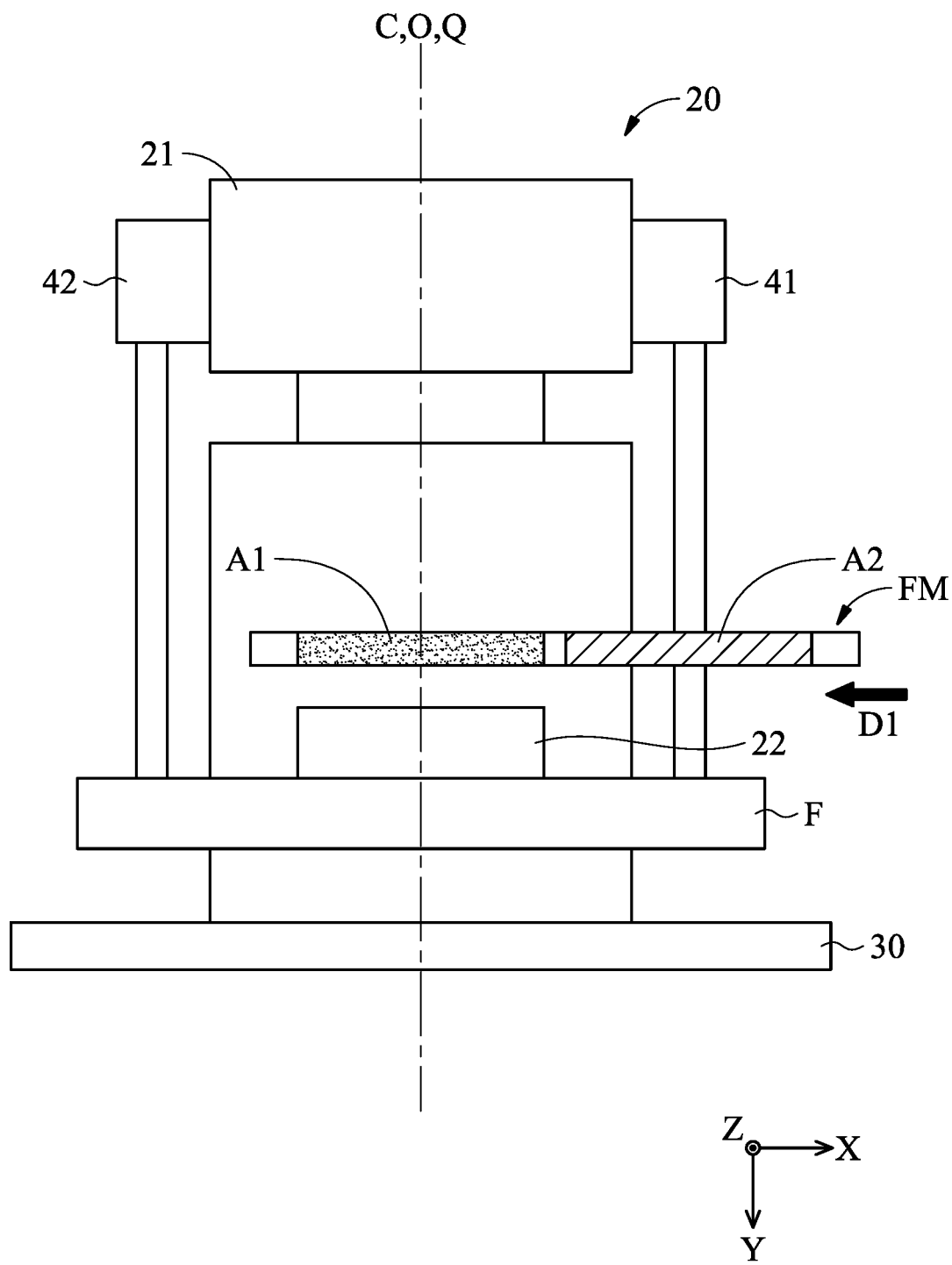
FIG. 2 is a top view perspective diagram of the configuration of the lens module, the display module, the IR light module, and a filter member.

FIG. 2 is a top view diagram of the lens module 20 and the display module 30 in FIGS. 1A and 1B. It should be noted that the optical axis O of the lens element 21, the central axis Q of the image sensor 22 and the central axis C of the display module 30 are coincidental. Therefore, a user can see the image capture from the lens module 20 on the display module 30 and the target is accurately aimed at.

Continuing referring to FIG. 2, a circuit board F (such as a flexible printed circuit board (FPCB)) is disposed in the main body 10, which is electrically connected to the lens module 20, the display module 30, the infrared light assembly 40 and the buttons B1 (FIG. 1A). The circuit board F is between the lens module 20 and the display module 30 in the direction of the optical axis O. In some embodiments, there are a plurality of circuit boards F disposed in the main body 10 which are electrically connected and corresponding to the lens module 20, the display module 30, the infrared light assembly 40, and the buttons B1, respectively.

Figure 3:
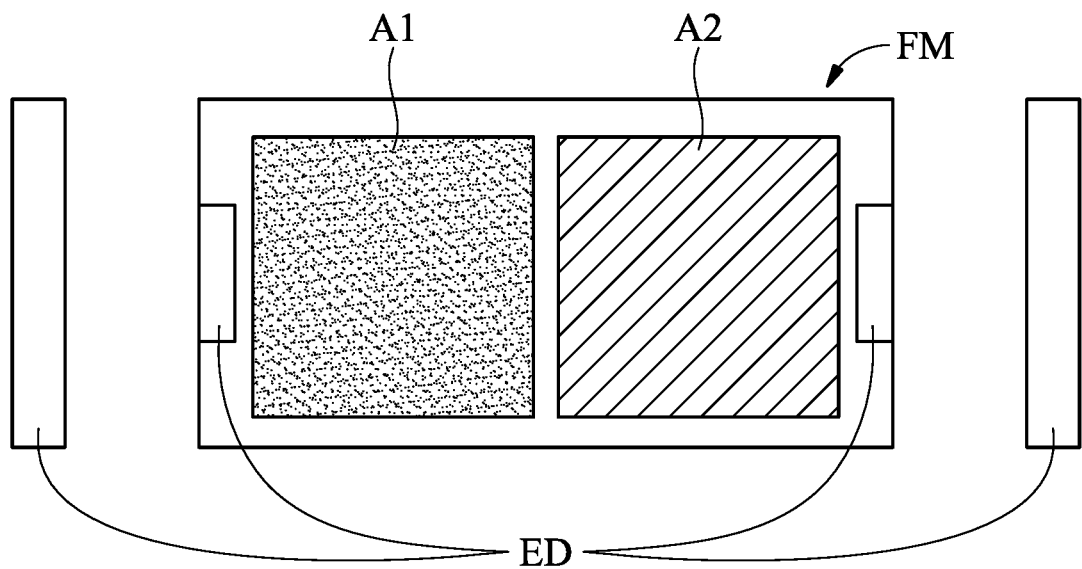
FIG. 3 is a schematic diagram of the filter member and an electromagnetic driving assembly.

Please refer to FIGS. 2 and 3. The sighting device 1 further comprises a filter member FM disposed between the lens element 21 and the image sensor 22, wherein the filter member FM has an infrared (IR) cutting region A1 and a transparent region A2. When hunting in the daytime, the ambient light is strong and enough, so there is no need to use the infrared light assembly 40, and the infrared cutting region A1 of the filter member FM is needed to filter the infrared light from daylight. When hunting in the early morning or close to night, the light is weak, so the infrared light assembly 40 needs to open and the infrared cutting region A1 of the filter member 30 should be moved away to obtain more light.

When the infrared light assembly 40 in the closed state (IR light does not open), the filter member FM is in a first position, wherein the infrared cutting region A1 overlaps the lens element 21 and the image sensor 22 in the direction of the optical axis O. When the infrared light assembly 40 is in the open state (a user presses the button B1 to open it to emit IR light), the filter member FM is in a second position, wherein the transparent region A2 of the filter member FM overlaps the lens element 21 and the image sensor 22 in the direction of the optical axis O, and the transparent region A2 no longer overlaps with them.

In this embodiment, the sighting device 1 further comprises an electromagnetic driving assembly ED disposed in the main body 10 and electrically connected to the circuit board F. The electromagnetic driving assembly ED is also connected to the filter member FM and has a driving coil and one or more magnetic elements (such as magnets) which correspond to each other. The electromagnetic driving assembly ED is configured to move the filter member FM along a first direction D1 (or the reverse direction—the second direction D2) according to the different state of the infrared light assembly 40. In particular, when an appropriate current is provided from a power source (not shown) to the coil, a magnetic force is generated between the coil and the magnetic element, so that the electromagnetic driving assembly ED can force the filter member FM to move.

Figure 4:
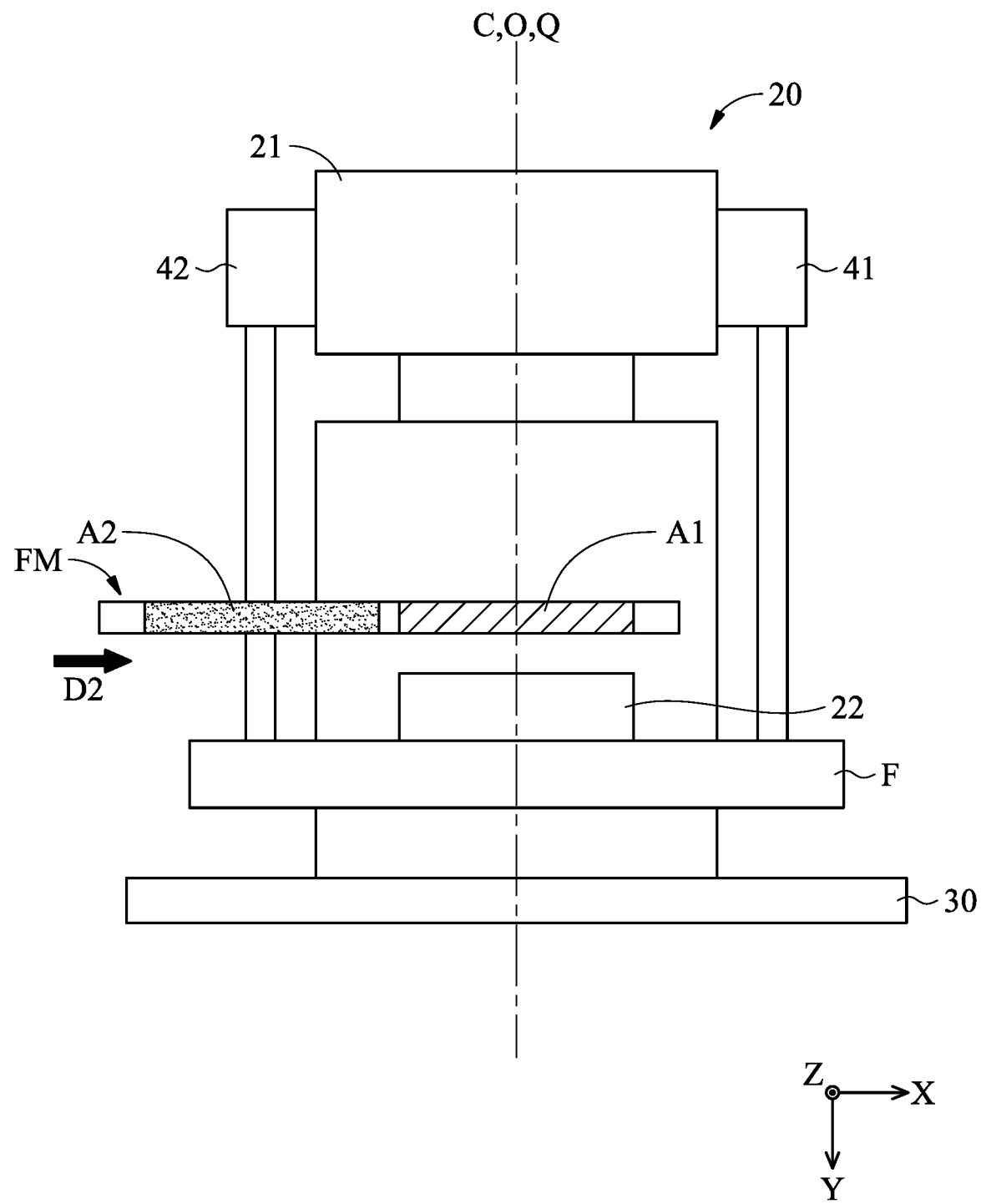
FIG. 4 is a schematic diagram of the filter member is moved along the first direction D1 in FIG. 2 to a second position.

The light being weak in the early morning, evening or night, the infrared light assembly 40 needs to open, and the electromagnetic driving assembly ED forces the filter member FM to move from the first position to the second position along the first direction D1 when the infrared light assembly 40 is in the open state (or when it is switched from the closed state to the open state), so that the transparent region A2 overlaps the lens element 21, as shown in FIG. 4. In daytime, the light is strong so that the infrared light assembly 40 needs to close, and the electromagnetic driving assembly ED forces the filter member FM to move from the second position to the first position along the second direction D2, as shown in FIG. 2, so that the infrared cutting region A1 overlaps the lens element 21 to filter the external infrared light.

Therefore, by switching the state of the infrared light assembly 40, the infrared cutting region A1 or the transparent region A2 of the filter member FM can be automatically switched to overlap with the lens element 21. The light from the outside passes through the lens element 21, the infrared cutting region A1 (or the transparent region A2) and then to the image sensor 22, sequentially. It is convenient to a user that he or she does not have to operate the filter member FM to move by him of herself.

Figure 5:
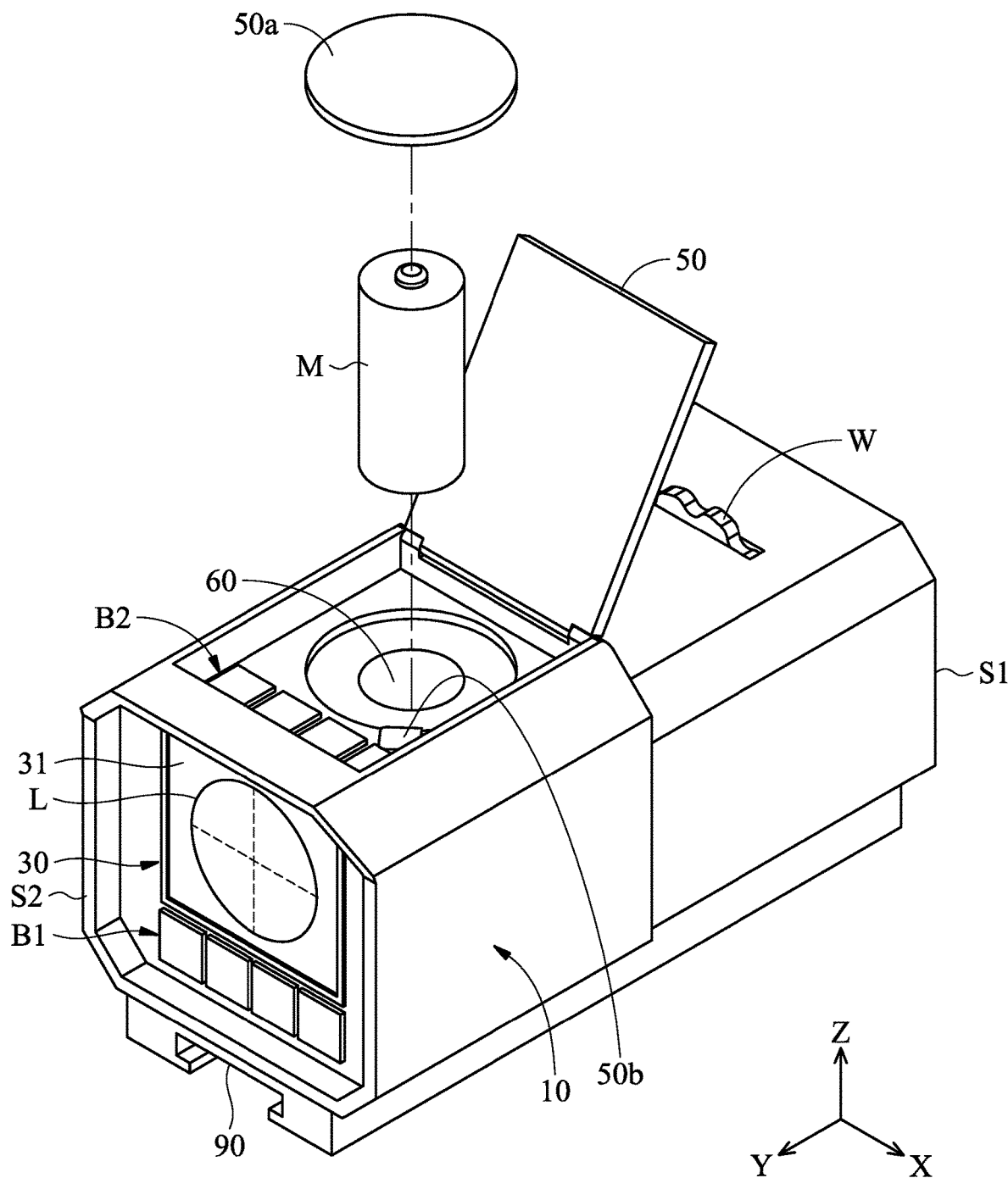
FIG. 5 is a schematic diagram of the lid is in an open state so that the buttons and the receiving space can be seen.

Referring to FIG. 5, which illustrates a lid 50 of the sighting device 1 is opened. The lid 50 is disposed on the top side of the main body 10 of the sighting device 1 and can be switched between an open state and a closed state. As shown in FIG. 5, the sighting device 1 further comprises a plurality of buttons B2 and a receiving space 60. The buttons B2 are configured to adjust the position of an aim line L (such as a crosshair, which can be used as an auxiliary line for aiming) displayed on the display surface 31 of the display module 30 (see FIG. 1B), wherein there may be the functions of moving the aim line L up, down, left, and right. The receiving space 60 is configured to receive a battery M (or a plurality of batteries), and when the receiving space 60 can be closed by an inner cover 50a, a fixing member 50b is configured to hold or affix the inner cover 50a to the main body 10. After the battery M is loaded and the settings for the aim line L by the buttons B2 are completed, the lid 50 can be closed to cover the buttons B2 and the receiving space 60 to protect them, and the situation of false touching can be avoided.

It should be noted that the receiving space 60 has an elongated structure for receiving the battery M, and the long axis direction (Z-axis) of the elongated structure is substantially perpendicular to the optical axis O of the lens element 21. This means that when the battery M is put in the receiving space 60, the long axis direction of the battery M is also substantially perpendicular to the optical axis O.

When the sighting device 1 is mounted on a shooting device, the optical axis O is substantially parallel to the shooting direction, and when the shooting device is fired, a shooting recoil force is generated in a direction that is substantially parallel to the optical axis O. With the aforementioned configuration of the battery M, the direction of the shooting recoil force and the long axis direction of the battery M are not parallel each other. In other words, the connection line between two electrical contacts for the battery M is not parallel to the shooting recoil force. Therefore, the battery M is not easily moved by the shooting recoil force, so that incidents of power outage due to poor battery contact can be reduced or avoided, significantly improving the quality of the sighting device 1.

Moreover, the sighting device 1 further comprises an adjusting ring W configured to adjust the lens module 20 to perform optical focus or optical zoom. It should be noted that the adjusting ring W is situated on the top side of the main body 10 so that the user can easily operate it to adjust the focal length of the lens module 20. Furthermore, since the adjusting ring W is near the lid 50, the user can easily and conveniently replace the battery and adjust the focal length.

Figure 6A:
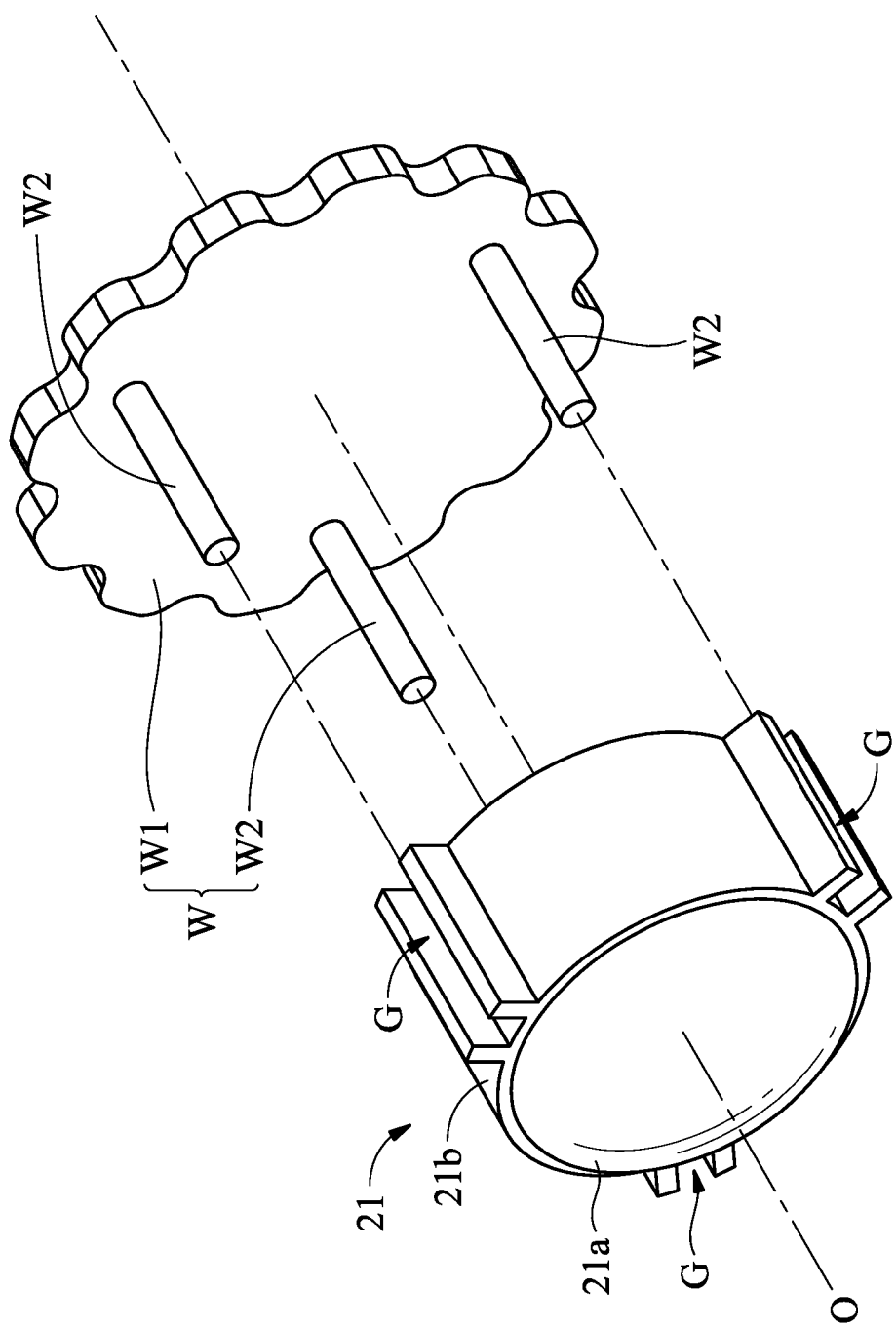
FIG. 6A is a schematic diagram of the adjusting ring and the lens module.
Figure 6B:
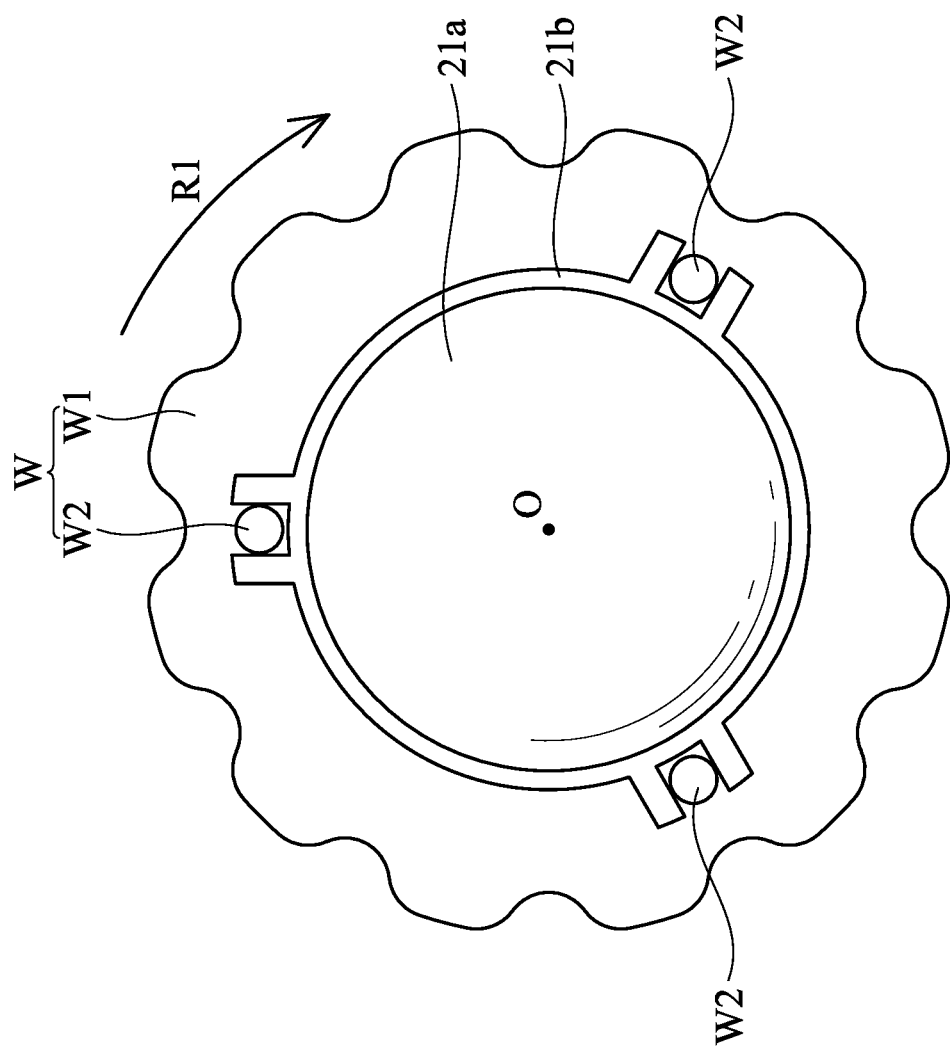
FIG. 6B is a schematic diagram of the adjusting ring and the lens module in FIG. 6A after assembly.

In some embodiments, as shown in FIG. 6A, the adjusting ring W has a main wheel W1 and a plurality of protruding rods (three rods) W2 disposed independently on the main wheel W1. The lens element 21 has a lens (or a lens assembly) 21a and a barrel 22b sustaining the lens 21a, wherein the lens 21a may have an inner barrel to protect the lens unit thereof, and the inner barrel is in contact with the barrel 21b by a threaded connection. The barrel 22b has a plurality of grooves (three grooves) G being separated and corresponding to the protruding rods W2. As shown in FIG. 6B, the protruding rods W2 engage with the grooves G, and when the user rotates the adjusting ring W to adjust the focal length in a rotating direction R1, the protruding rods W2 force the barrel 22b to rotate (also in the rotating direction R1), and the lens 22a is forced by the rotating barrel 22b to move along the optical axis O. Thus, manual focus or manual zoom is achieved. It should be noted that the connection mechanism between the protruding rods W2 and grooves G can improve stability and accuracy when manually focusing or zooming.

Figure 7:
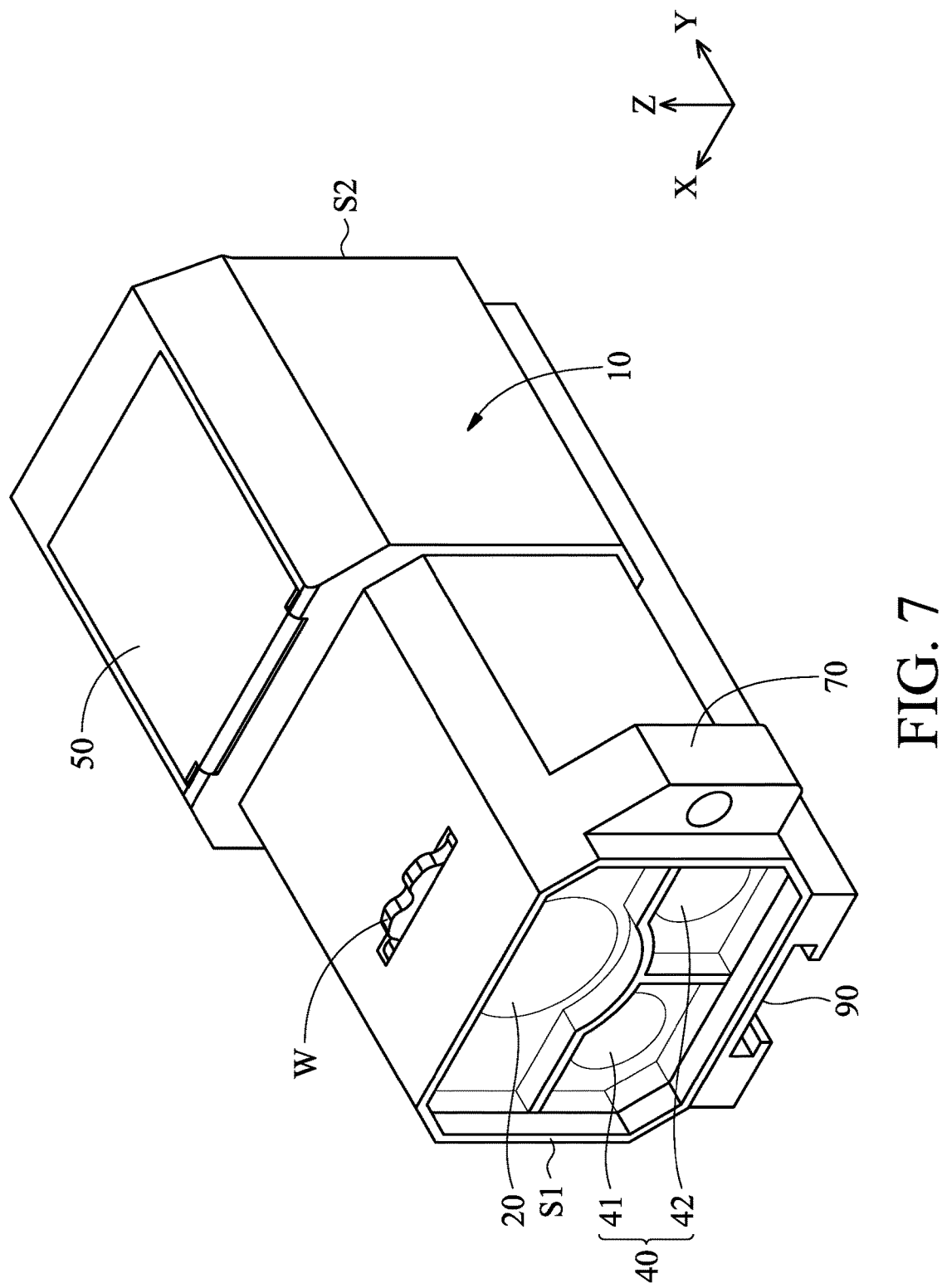
FIG. 7 is a schematic diagram of a sighting device according to another embodiment of the invention.

FIG. 7 is a sighting device 2 according to another embodiment of the present invention. Compared with the sighting device 1 in FIG. 1A, the sighting device 2 further comprises a range finder module 70 disposed on a lateral side of the main body 10, which is configured to determine the distance to a target (or determine a distance between the sighting device 2 and a target). In the present embodiment, the range finder module 70 may be a laser rangefinder which uses a laser beam to determine the distance to an object. For example, the range finder module 70 emits a laser pulse to the object to be measured and starts timing, and stop timing when the reflected light is received. This time can be converted to the distance between the range finder module 70 and the target.

Figure 8:
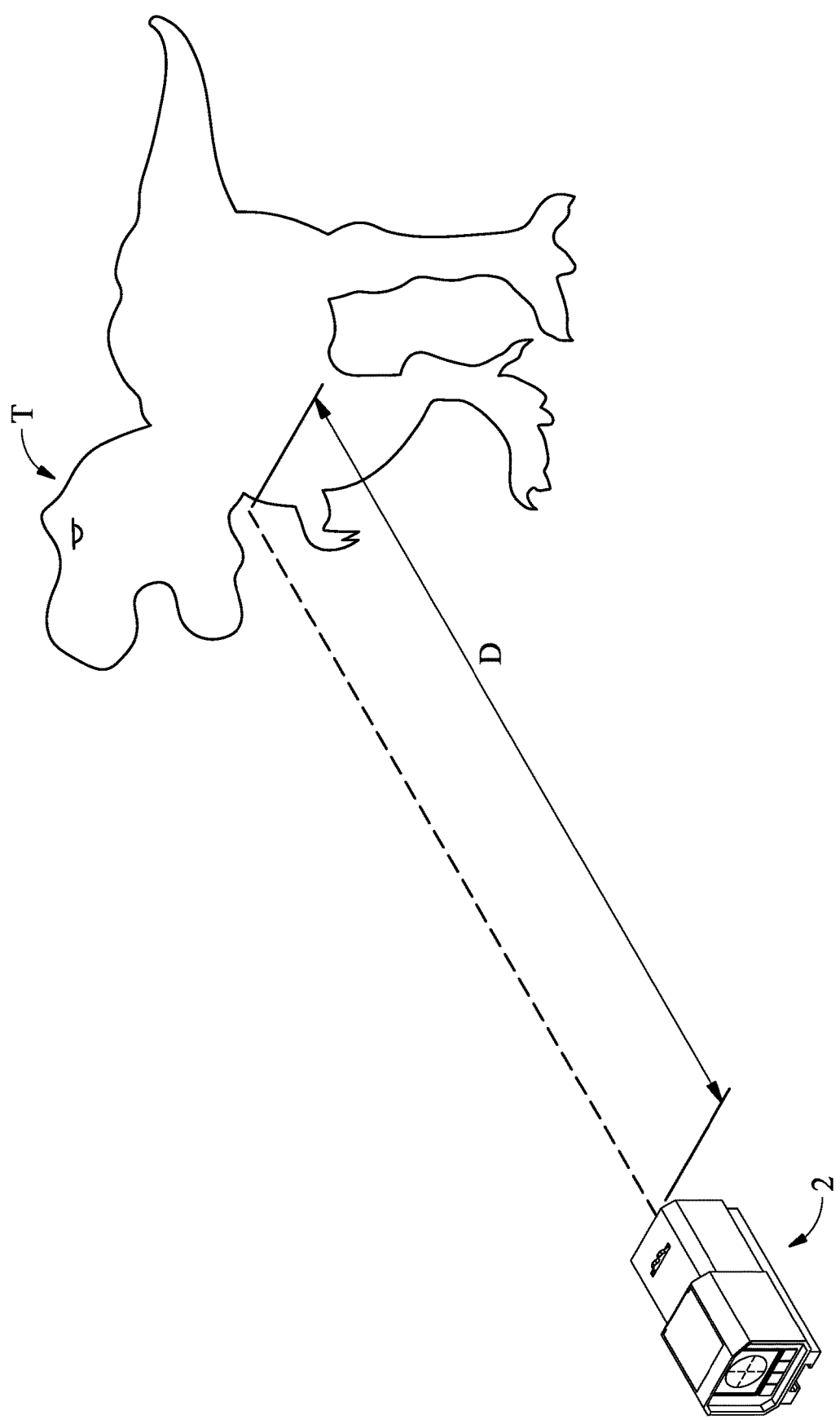
FIG. 8 is a schematic diagram of the sighting device in FIG. 7 and a target with a distance therebetween.
Figure 9:
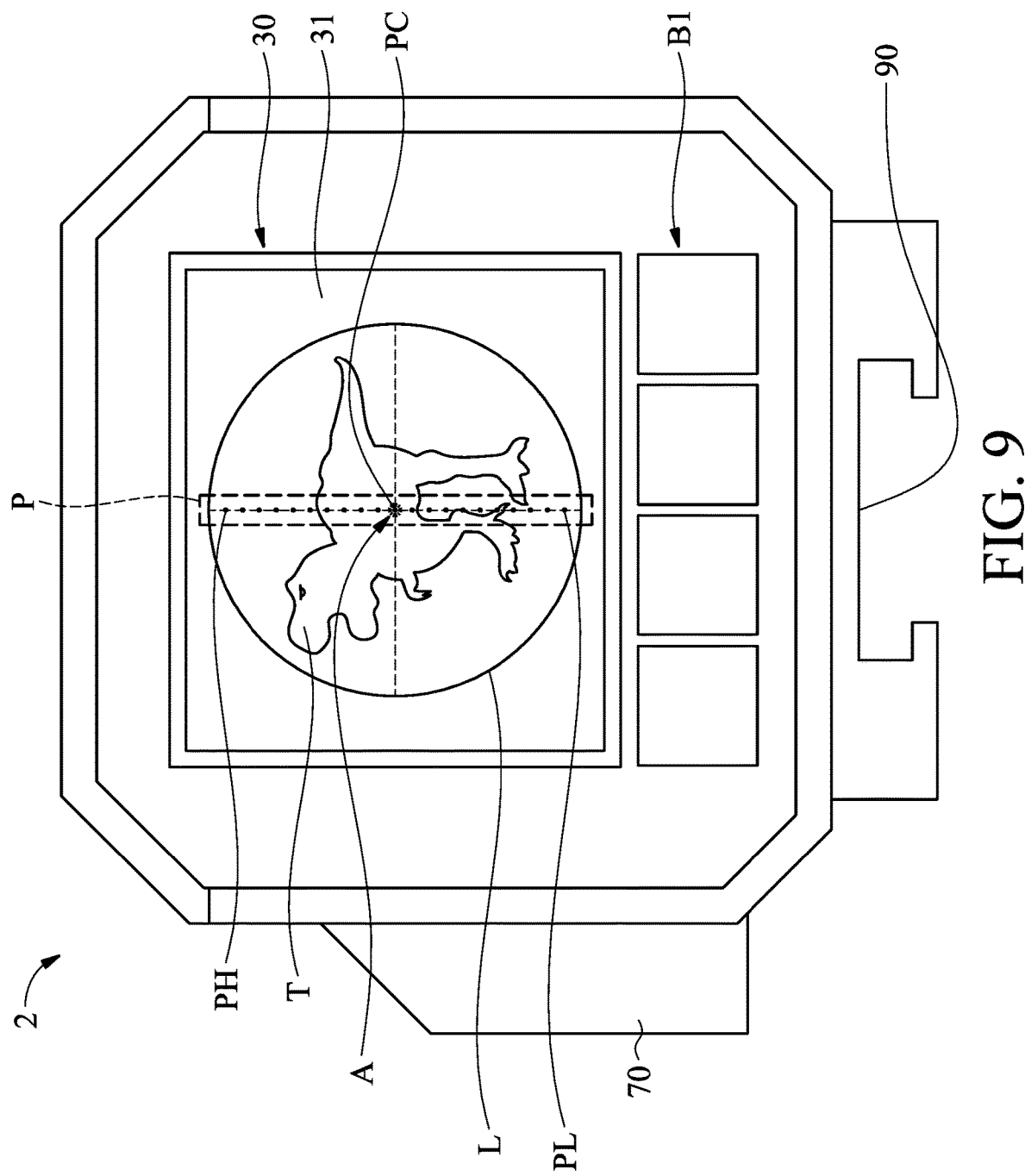

FIG. 8 is a diagram illustrating the sighting device 2 and a target T where there is a distance D therebetween. When a user uses the sighting device 2 to aim a shooting device at the target T, the range finder module 70 can be turned on by a button (such as one of the buttons B1) to calculate the distance D between the target T and the sighting device 2. After that, as shown in FIG. 9, an aim point A is shown on the display surface 31 of the display module 30 according to the calculation result of the range finder module 70. In particular, the display module 30 has a plurality of aim point positions P on the display surface 31. One of the aim point positions P may be lit up to show the aim point A according to the calculation result of the range finder module 70. In some embodiments, the range finder module further has a level component (e.g., bubble level), wherein the angle of elevation or declination may be obtained from the level component, which can compute the angle above or below horizontal of the shooting device. In combination with the angle and the distance information, the aim point A is shown according to the calculation result of the range finder module 70. Therefore, the user can adjust the shooting device (such as by adjusting the angle at which the shooting device is aimed at the target T) to sight the target T and easily make an accurate shot via the lit position P (the aim point A).

In some embodiments, there are at least twenty (20) aim point positions P arranged in a vertical direction on the display surface 31 (such as an LCD panel) of the display module 30 (in FIG. 9, twenty-one (21) aim point positions P are depicted), and each two adjacent aim point positions P represent the actual distance to a target of predetermined distance (e.g., 10 or 20 yards), wherein the central aim point position PC is on the central axis C and is set to represent the actual distance to a target of predetermined distance. In some embodiments, the central aim point position PC may be set to represent the actual distance at any number of yards, such as 50, 100, 120 or 150 yards or another distance. As a result, by using the LCD panel instead of a LED panel, more aim point positions P may be depicted on the display surface 31, so that the sighting device 2 is more precise.

Specifically, those aim point positions P are arranged in a direction which is perpendicular to the central axis C (vertical direction), wherein the positions P that are closer to the lower portion of the display surface 31 are farther away from the target. In some embodiments, the lowest position PL represents about 200 yards to a target, and the highest position PH represents 10 yards to a target. In some embodiments, the positions P may show other ranges of distance values, such as 20 to 300 yards to a target, calculated by the range finder module 70. Furthermore, in some embodiments, when pressing one of the operate buttons B1, the range finder module 70 performs and determines the distance to the target and the lens module 20 performs video recording.

In summary, a sighting device is provided, configured to aim at a target, primarily comprising a main body, a lens module, a display module, an infrared (IR) light assembly, and a filter member. The main body includes a first side and a second side which is opposite to the first side. The lens module is disposed on the first side, wherein the lens module includes a lens element and an image sensor. The display module is disposed on the second side and connected to the lens module, wherein the display module is configured to display an image captured from the lens module. The infrared light assembly is disposed on the first side, wherein the infrared light assembly can be switched between an open state and a closed state. The filter member is disposed between the lens element and the image sensor and having an infrared cutting region, wherein the infrared cutting region overlaps the lens element and the image sensor in the direction of the optical axis of the lens element according to the infrared light assembly in the closed state, and the infrared cutting region does not overlap the lens element when the infrared light assembly is in the open state. Therefore, the filter member can be switched via the on/off-state of the infrared light assembly, so that it is convenient for the user who does not need to operate the filter by him or herself. Moreover, when shooting or hunting in the early morning or close to night, the display module can still clearly show the target based on the lens module's ability to operate in a high-sensitivity mode or opening the infrared light assembly. Furthermore, due to the display module having an LCD panel, more aim point positions can be depicted on the display surface, providing the user better accuracy of sighting the target.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the invention. It is intended that the standard and examples be considered as exemplary only, with the true scope of the disclosed embodiments being indicated by the following claims and their equivalents.

What is claimed is:

1. A sighting device, configured to aim at a target, comprising:
    a main body, including a first side and a second side which is opposite to the first side;
    a lens module disposed on the first side, wherein the lens module includes a lens element and an image sensor;
    a display module, disposed on the second side and connected to the lens module, wherein the display module is configured to display an image captured from the lens module;
    an infrared (IR) light assembly, disposed on the first side, wherein the infrared light assembly can be switched between an open state and a closed state;
    a filter member, disposed between the lens element and the image sensor and having an infrared cutting region; and
    an adjusting ring, disposed on the top side of the main body, wherein the adjusting ring is configured to adjust the lens module to perform optical focus or optical zoom;
    wherein the infrared cutting region overlaps the lens element and the image sensor in the direction of an optical axis of the lens element according to the infrared light assembly in the closed state, and the infrared cutting region does not overlap the lens element when the infrared light assembly is in the open state;
    wherein the adjusting ring has a main wheel and a plurality of protruding rods separately disposed on the main wheel, and the lens element has a barrel having a plurality of grooves, wherein the protruding rods correspond to and engage with the grooves.

2. The sighting device as claimed in claim 1, wherein the filter member further has a transparent region, and when the infrared light assembly is in the open state, the transparent region overlaps the lens element and the image sensor in the direction of the optical axis.

3. The sighting device as claimed in claim 2, wherein the transparent region and the infrared cutting region are arranged in a first direction, and the first direction is perpendicular to the optical axis.

4. The sighting device as claimed in claim 1, further comprising an electromagnetic driving assembly disposed in the main body, wherein when the infrared light assembly is switched from the closed state to the open state, the filter member is forced to move along a first direction by the electromagnetic driving assembly.

5. The sighting device as claimed in claim 4, wherein when the infrared light assembly is switched from the open state to the closed state, the filter member is forced to move along a second direction by the electromagnetic driving assembly, wherein the second direction is opposite to the first direction.

6. The sighting device as claimed in claim 1, wherein the optical axis of the lens element, a central axis of the image sensor, and a central axis of the display module are coincidental, and an aim point is displayed on the display module according to the distance to the target.

7. The sighting device as claimed in claim 1, further comprising a receiving space for receiving at least one battery and a plurality of buttons configured to move an aim line displayed on a display surface of the display module, wherein the receiving space and the buttons are disposed on the top side of the main body.

8. The sighting device as claimed in claim 7, wherein the receiving space has an elongated structure for receiving the battery, and the long axis direction of the elongated structure is substantially perpendicular to the optical axis of the lens element.

9. The sighting device as claimed in claim 8, further comprising a lid disposed on the top side of the main body, wherein the lid is configured to cover the buttons and the receiving space.

10. The sighting device as claimed in claim 1, wherein when the adjusting ring rotates, the protruding rods which engage with the grooves rotate and force the barrel to rotate in a rotating direction, and a lens of the lens element disposed in the barrel is forced to move along the optical axis of the lens element by the rotating barrel.

11. The sighting device as claimed in claim 10, wherein the lens has an inner barrel and a lens unit, and the inner barrel protects the lens unit and is in contact with the barrel by a threaded connection.

12. The sighting device as claimed in claim 1, further comprising a plurality of operating buttons disposed on the second side of the main body, wherein the operating buttons are configured to operate the lens module, the display module and the infrared light assembly.

13. The sighting device as claimed in claim 1, further comprising a range finder module configured to determine the distance between the sighting device and the target, wherein the range finder module is disposed on a lateral side of the main body, and an aim point is displayed on the display module according to the distance to the target determined by the range finder module.

14. The sighting device as claimed in claim 13, a plurality of aim point positions are on a display surface of the display module in a direction that is perpendicular to the central axis of the display module, and when the range finder module determines the distance to the target, one of the aim point positions is lit as the aim point.

15. The sighting device as claimed in claim 14, wherein there are at least twenty aim point positions on the display surface of the display module, and the aim points positions are arranged in a direction that is perpendicular to the central axis of the display module.

16. The sighting device as claimed in claim 15, wherein the display module has a liquid-crystal display (LCD) panel.

17. The sighting device as claimed in claim 13, wherein when the button is pressed, the range finder module performs and determines a distance to the target and the lens module performs video recording.

* * * * *